United States Patent
Cabrera Godoy

(10) Patent No.: US 8,602,617 B2
(45) Date of Patent: Dec. 10, 2013

(54) LIGHTING AND/OR SIGNALING DEVICE FOR A MOTOR VEHICLE PRODUCING A LIGHT BEAM ON THE SIDE OF A MOTOR VEHICLE

(75) Inventor: Javier Cabrera Godoy, Bobigny Cedex (FR)

(73) Assignee: Valeo Vision (FR)

( * ) Notice: Subject to any disclaimer, the term of this patent is extended or adjusted under 35 U.S.C. 154(b) by 1555 days.

(21) Appl. No.: 11/282,441

(22) Filed: Nov. 17, 2005

(65) Prior Publication Data

US 2006/0109673 A1 May 25, 2006

(30) Foreign Application Priority Data

Nov. 18, 2004 (FR) ...................................... 04 12265

(51) Int. Cl.
*F21V 5/02* (2006.01)
(52) U.S. Cl.
USPC ............................ 362/520; 362/327; 362/522
(58) Field of Classification Search
USPC ......... 362/498, 520, 521, 522, 317, 326, 327, 362/328, 331, 336, 341
See application file for complete search history.

(56) References Cited

U.S. PATENT DOCUMENTS

| | | | | |
|---|---|---|---|---|
| 1,208,456 A | * | 12/1916 | Bell | 362/309 |
| 1,230,670 A | * | 6/1917 | Cassady | 362/309 |
| 1,348,618 A | * | 8/1920 | Zorger | 362/309 |
| 1,604,213 A | * | 10/1926 | Zorger | 362/309 |
| 2,058,707 A | | 10/1936 | McGregor | 240/41.4 |
| 4,949,226 A | | 8/1990 | Endoh et al. | |
| 5,710,671 A | | 1/1998 | Bichlmaier | 359/742 |
| 6,146,004 A | * | 11/2000 | Flottmeyer et al. | 362/522 |
| 6,471,380 B1 | * | 10/2002 | Henneboehle et al. | 362/498 |
| 6,547,423 B2 | * | 4/2003 | Marshall et al. | 362/333 |
| 6,986,594 B2 | * | 1/2006 | Wirth et al. | 362/328 |
| 2003/0156417 A1 | * | 8/2003 | Gasquet et al. | 362/329 |

FOREIGN PATENT DOCUMENTS

| | | |
|---|---|---|
| EP | 0 864 462 | 2/2002 |
| EP | 1 243 844 A2 | 9/2002 |
| FR | 2 847 656 A1 | 11/2002 |
| JP | 2003-86009 | 3/2003 |

OTHER PUBLICATIONS

MicroPatent Report for JP 2003-086009A (Abstract).
French Search Report dated Jul. 14, 2005 for FR 04 12 265.
Dialog English Language Abstract for EP 0 864 462.

* cited by examiner

*Primary Examiner* — Y My Quach Lee
(74) *Attorney, Agent, or Firm* — Locke Lord LLP

(57) ABSTRACT

The object of the invention is an optical module intended to equip a lighting and/or a signaling device for a motor vehicle, the said optical module comprising at least one reflector associated with at least one light source. The said optical module comprises at least one optical element disposed at the front of the light source and able to deviate rays directly emitted by the source and/or emitted by the source and then reflected by the reflector, the deviation of the rays comprising at least one step of total reflection of the said rays in the said optical element.

19 Claims, 2 Drawing Sheets

LIGHTING AND/OR SIGNALING DEVICE FOR A MOTOR VEHICLE PRODUCING A LIGHT BEAM ON THE SIDE OF A MOTOR VEHICLE

FIELD OF THE INVENTION

The invention relates to light and/or signaling devices for a motor vehicle, and in particular to headlights for motor vehicles.

BACKGROUND OF THE INVENTION

It concerns more particularly the production of light beams illuminating on the side of the vehicles. This means light beams illuminating in a general/average orientation oblique with respect to the longitudinal axis X of the vehicle.

It may be a case, within the meaning of the invention and non-limitingly, of the light beams emitted by optical modules for providing on bends additional lighting on the side where the vehicle is turning. This functionality is known by the term "fixed bending light", or FBL (the English abbreviation for "fixed bending light"). It is described for example in the patent EP 864 462. The beam of the FBL is thus associated with a standard beam of the dipped type emitted by a so-called principal optical module, in order to give a global beam with a greater angular opening, the said global beam having to comply with a photometric grid defined in the current regulations concerning the so-called AFS (the abbreviation of the English term "advanced front lighting systems") functions.

It may also be a case of the light beams providing a lighting function known by the English term "cornering", that is to say lighting on corners, the purpose of which consists of providing more illumination on the sides of the vehicle to allow better visibility for the driver of the vehicle (lighting function) but also to enable the external environment of the vehicle to better discern the vehicle (signaling functions). This function is, by itself, defined by a specific photometric grid provided in the current regulations.

The point common to these two types of beam, "cornering" and complementary FBL beam, is that it is necessary to manage to send sufficient light on an oblique axis with respect to the longitudinal axis of the vehicle, which poses a certain number of problems, since normally the lights comprise one or more optical modules emitting light beams whose optical axis coincides more or less with the longitudinal axis X of the vehicle. ("Optical module" means a set of components comprising at least one reflector, its associated light source or sources and possibly associated optical elements of the dioptric element, Fresnel lens, etc, type) and able to emit at least one given light beam.

A first solution consists of turning inside the light the module intended to illuminate laterally with respect to the other optical modules: the normal configuration of the light is kept, with its principal modules, for example the one emitting the dipped or main beam, and the complementary FBL or "cornering" module is turned, so that its optical axis makes an angle with the optical axis of the other modules.

This solution does however have its limits: a module that is turned is more bulky inside the light, with in particular lamp connectors disposed obliquely, a reflector taking up more space. However, it is compactness that is more and more being sought in a headlight. Moreover, turning the module in this way tends to cause a loss of light flux emitted by the module: the most oblique rays have a tendency no longer to be able to leave the headlight closure glass and rather to strike the style parts which clad the optical modules and provide continuity of surface between the modules and the walls of the housing or the housing/closure glass junction zone. Therefore, according to the shape of the headlight, the amplitude of the rotation of the module is therefore more or less limited, and it is difficult to ensure that the beam emitted by the module and actually emerging from the headlight is indeed compatible with the regulations in force.

The aim of the invention is therefore to remedy the drawbacks of this first solution by proposing in particular a novel design of lateral illumination module that is in particular more flexible, has higher performance, or is less constraining with regard to the design of the headlight including the module in question.

SUMMARY OF THE INVENTION

The optical module according to the invention is intended to equip a lighting and/or signaling device for a motor vehicle, the said optical module comprising at least one reflector associated with at least one light source. This optical module comprises at least one optical element disposed at the front of the light source and able to deviate rays directly emitted by the source and/or emitted by the source and then reflected by the reflector, the deviation of the rays comprising at least one step of total reflection of the said rays in the said optical element.

The invention has therefore exploited the optical principle of total reflection, which is based on the law of refraction of light rays passing from one medium to another, and which states that a light ray that passes from a medium 1 with a refractive index n1 to a medium 2 with a refractive index n2 follows the law:

$$n1 \sin \alpha 1 = n2 \sin \alpha 2,$$

with $\alpha 1$ the angle of incidence of the ray with respect to the normal to the plane separating the two media, and $\alpha 2$ the angle of incidence of the ray leaving the said plane with respect to the normal to the said plane.

If it is considered that the medium 2 is air, of index 1, and the medium 1 a plastic material or of the glass type, and if the maximum possible angle $\alpha 1$ for there to be refraction is calculated, if n2=1 is posed, and sine $\alpha 2$ max=1, the following equation is arrived at:

$$\alpha 1 \max = a \sin(1/n1)$$

Refraction is therefore no longer possible as soon as $\alpha 1$ is greater than $\alpha 1$ max. In this case there is then reflection with an angle equal to $-\alpha 1$.

By choosing an appropriate shape for the optical element, it will be possible to divert the incoming rays, those emitted by the lamp and reflected by the reflector, sufficiently for them to have the required general lateral orientation, without having to turn the optical module as a whole.

Advantageously, the optical element is a lens having an entry face and an exit face for the light rays, the said entry face being substantially planar and substantially perpendicular to the optical axis of the light source. The rays will thus enter the optical element without being substantially diverted in the material making up the lens.

This lens can be made from glass or polymer material, for example chosen from the family of polycarbonates or PMMAs (polymethyl methacrylates), and with a refractive index preferably between 1.40 and 1.65, in particular between 1.49 and 1.59.

Advantageously, the exit face of the optical element has a profile comprising a succession of flutes where the general orientation of the ridges is along an axis substantially perpendicular to the optical axis. It is at these flutes that the total reflection of the rays entering the lens will take place, by virtue of an appropriate choice of the angles of the surfaces defining these flutes, in particular with respect to the entry face, with respect to the optical axis of the module or between the surfaces of one and the same flute. Examples of geometric definitions of these will be described below.

The flutes preferably extend from one edge of the lens to the other. The ridges of the flutes preferably have a general orientation along an axis (Y) that is substantially vertical, or oblique with respect to the vertical. The terms "oblique", "horizontal" or "vertical" should be understood throughout the present text as the terms relating to the position of the component in question, once the module is inserted in the lighting device, the assembly being in the position of mounting in the vehicle bodywork.

The flutes are preferably defined by a ridge delimiting:
a first so-called arrival surface that works in total reflection vis-à-vis the said light rays coming from the entry face of the optical element and arriving on the said surface,
a second so-called departure face for the light rays, and which works in refraction vis-à-vis the light rays coming from the entry face of the optical element and arriving on the said surface: the rays arriving at the second surface come for the most part from the first surface through the thickness of the flute. It is thus a path of the light rays that commences with a refraction in the thickness of the lens through its entry face and then a total reflection, still in the thickness of the lens, and finally a refraction once again towards the outside lens.

The flutes on the exit face of the lens preferably have first so-called arrival surface for the rays, which is planar or curved, such that the said planar surface or the plane tangent to the said curved surface is inclined with respect to the optical axis (X) of the optical module by an angle α of at least 20°, and in particular between 25° and 50°.

Alternately or cumulatively, the flutes on the exit face (6) of the lens preferably have a first arrival surface for the rays, which is planar or curved, such that the said planar surface of the plane tangent to the said curved surface is inclined with respect to the entry face of the lens by an angle β of at least 40°, in particular between 40° (or 45°) and 65°.

Advantageously, the flutes on the exit face of the lens have a second so-called departure surface for the rays, which is planar or curved, the angle σ at the vertex A of the ridge between the arrival face and the departure face of their respective tangents being between 20° and 75°, preferably between 40° and 50°.

The flutes described above can be contiguous, a configuration which will be favored in order to ensure a maximum lateral diversion of the rays passing through the optical element. However, it is also possible to choose them so as to be non-contiguous: they can be separated by optical zones, for example planar and parallel to the entry face of the lens, to enable part of the rays to continue their path beyond the lens in a general orientation close to the optical axis of the optical module. They can also be separated by zones able to modify the path of the rays that strike them: it is thus possible to alternate the flutes working in total reflection with different flutes working only in refraction for example. This configuration allows a great deal of flexibility in the final beam obtained, by finely modulating its angular distribution, its spread in particular.

Advantageously, the height of the flutes on the lens, in particular those working in total reflection, is between 0.2 and 12 mm, preferably between 1 and 4 mm. The flute height is defined in the following manner in the present invention: the perpendicular to the entry face of the lens passing through the ridge of the flute is taken and the distance, on this straight line, separating the ridge from the intersection of the straight line with the entry face of the lens.

One advantage of the optical element according to the invention is its high efficiency: it causes only very slight losses or leakages of stray light.

Another advantage of the optical element of the lens type according to the invention is industrial: it is possible to use the same optical element, whether the module is intended to equip a right-hand headlight or a left-hand headlight on a car. It suffices to make the optical element pivot through 180° in order to change from a "right-hand" module to a "left-hand" module, the "bottom" of the element for a left-hand module becoming the "top" of the element for a right-hand module, which simplifies production and management of the stocks of the element in question: only one mould is necessary. It is possible to equip the lens with one or more peripheral marks serving as locators for the mounting of the lens in the module.

The reflector of the optical module can be of the complex-surface type or of the type with parabolic generatrices, or of the elliptical type. The optical module can be able to generate a light beam with or without cutoff.

As already mentioned above, the module according to the invention finds in particular an application as a complementary lighting module for a motor vehicle headlight equipped with a fixed bending dipped function. It then generates rather a beam of the cutoff type. It also finds an application as so-called "cornering" lateral lighting, for a motor vehicle headlight, and in this case it generates a beam more generally without cutoff.

The invention will be described below with the help of a non-limiting example illustrated by the following figures:

DESCRIPTION OF THE PREFERRED EMBODIMENTS

All these figures are schematic and are not necessarily to scale. Not all the components are shown, but only those directly concern the invention, in order to facilitate reading thereof.

Figure 1:
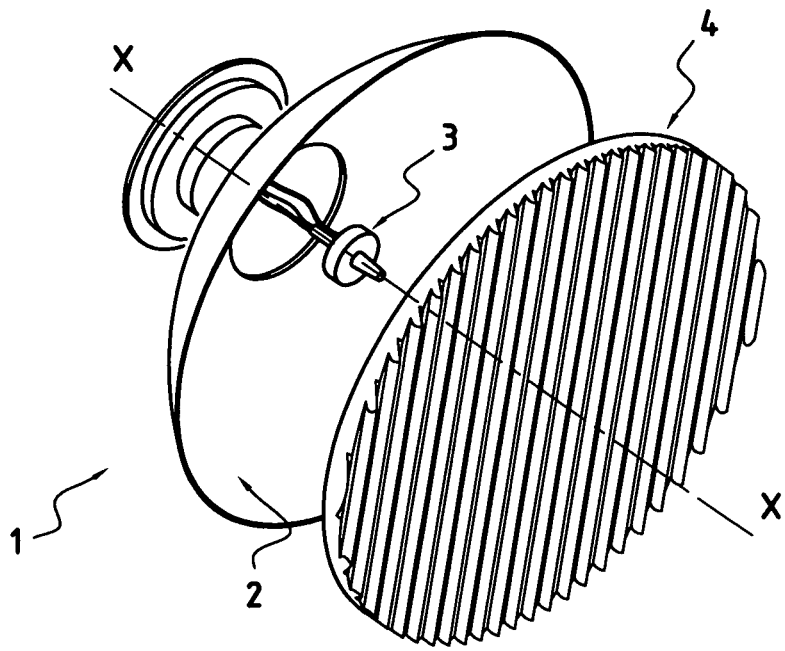
FIG. 1: a perspective view of an optical module according to the invention

FIG. 1 depicts in perspective an optical module 1 comprising a reflector 2, a light source of the halogen lamp or xenon lamp type 3, and a lens 4. The reflector 2 is of a complex surface type, defined so as to generate a beam with a flat cutoff. The function of the module is to generate a beam complementary to the dipped beam of the bending dipped or FBL type, when the road bends, this complementary beam having a general orientation forming an angle of at least 40° with respect to the optical axis of the light source 3 or, which generally amounts to the same thing in the context of the invention, with respect to the longitudinal axis X of the vehicle. The lens 4 has been defined so as to obtain this deviation of at least 40° by means of flutes S present on its exit face and working in total reflection. It is made from polycarbonate and has a refractive index of approximately 1.59. Any other polymer material or a material of the glass type with a suitable refractive index is also suitable.

Figure 2:
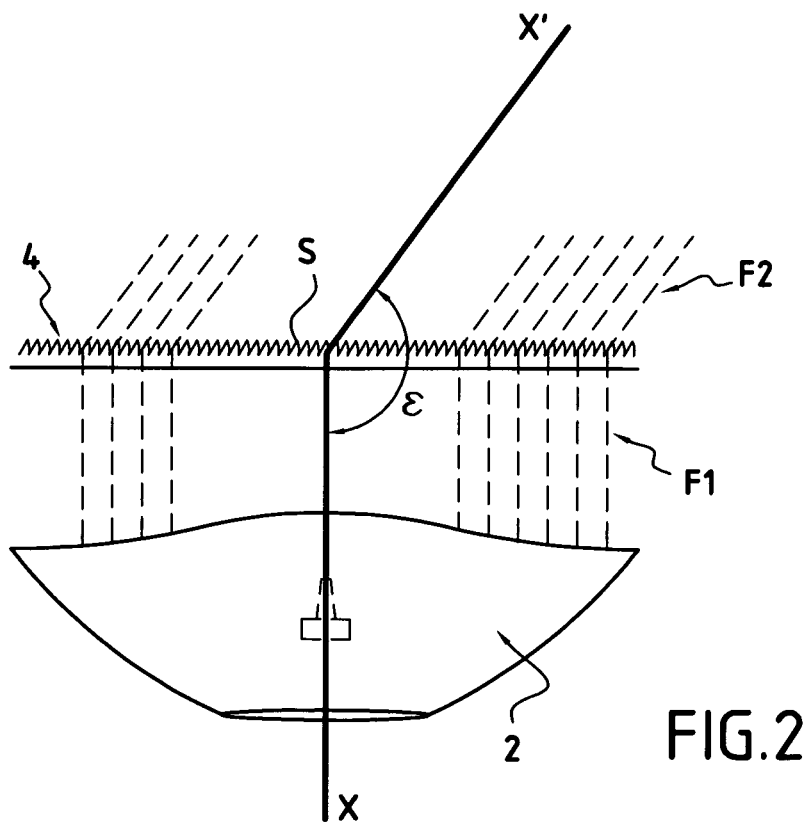
FIG. 2: a view in horizontal section of the reflector and of the lens of the optical module according to FIG. 1

FIG. 2 shows schematically the light flux F1 emitted by the source 3 and then reflected by the reflector 2, which enters the lens 4 in order to be almost entirely redirected in the form of a flux F2 at approximately 45° with respect to the initial optical axis (X), whilst all the elements fulfilling an optical role in the module, namely the source, the reflector and the lens, remain disposed along the axis (X) of the source (and of the vehicle).

Figure 3:
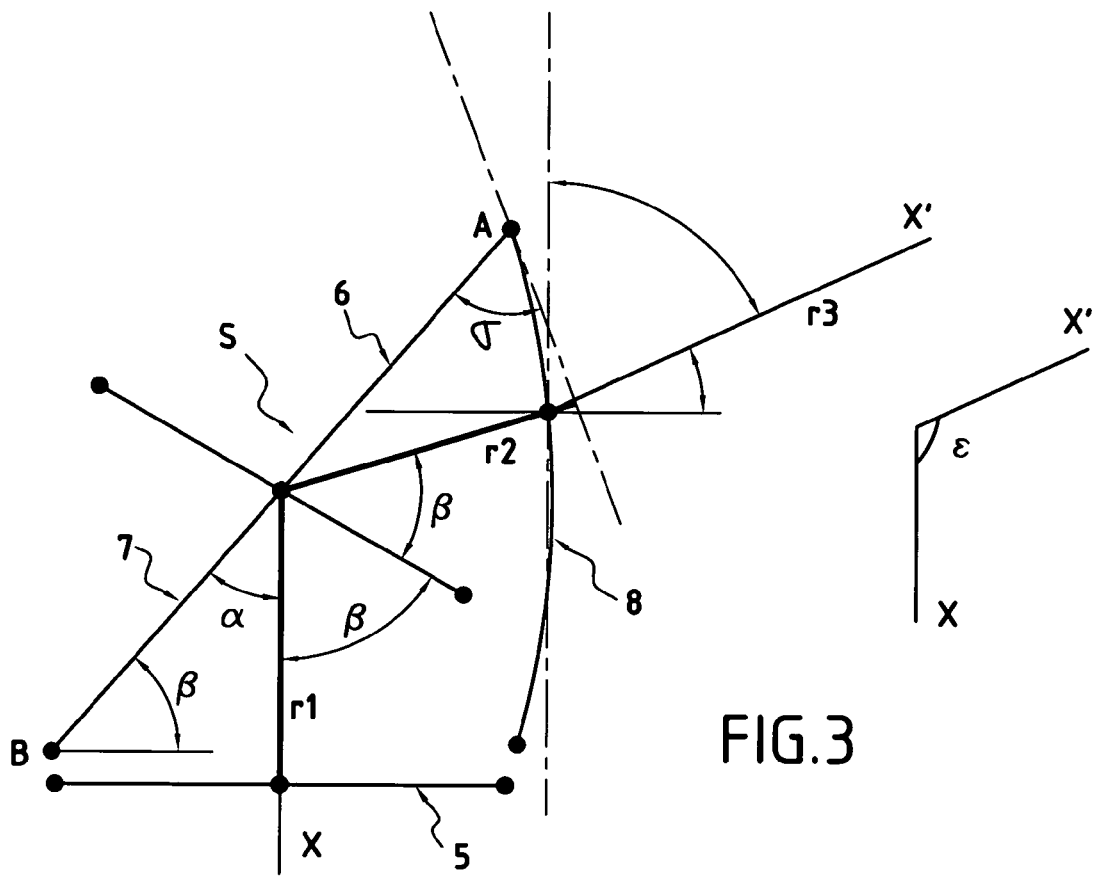
FIG. 3: a representation of the path of a light ray passing through the lens of the optical module depicted in FIG. 2

FIG. 3 is an enlargement on a flute S on the lens 4 in horizontal section, with a representation of the path of a light ray through the flute. The description of the lens according to the example depicted in FIGS. 1 to 3 is only a preferred example, but does not limit the invention. The lens according to this example is defined by an entry face 5, which is substantially planar and perpendicular to the optical axis X of the module 1, and by an exit face 6 that is a succession of flutes S that extend from one edge of the lens to another. These flutes are disposed parallel to one another, and vertically, if the lens is considered in the position that it has in the module in the position of mounting in the vehicle. These flutes S are also contiguous. They each have a height h defined above (and shown in FIG. 4) of approximately 4 mm.

Each flute is delimited by a ridge A separating two faces:
  a first face, referred to as the arrival face 7 for the rays. Here, this face is planar and inclined with respect to the optical axis X by an angle α of approximately 30°.
  a second face referred to as the departure surface 8, which is slightly convex and curved, and whose tangent to the vertex A with the first face 7 forms an angle σ of approximately 70°. Alternatively, this surface 8 can also be planar, and join the base of the flute B perpendicular thereto and therefore parallel to the optical axis X, or obliquely with respect to the said base B. The base B is a plane parallel to the entry surface 5 of the lens.

The path of a ray r1 in this flute is broken down as follows:
  a ray r1 comes from the flux F1 depicted in FIG. 2, it was emitted from the source 3 and then reflected by the reflector 2, it therefore strikes the entry face 5 of the lens 4 substantially perpendicularly. Since the entry face is perpendicular to the optical axis X, the ray r1 is not diverted when entering the lens, it therefore continues its path as far as the arrival surface 7 of the flute S. As the angle with which it strikes the surface 6 is greater than a threshold value depending in particular on the compared refractive indices of air and the lens, there is a total reflection of the ray r1 in the lens
  the ray r1 then starts again in the flute in the form of a ray r2 in the direction of the departure surface 8
  the ray r2 strikes the departure surface 8, undergoes a refraction there and leaves the flute in the form of a ray r3 diverted by a certain angle with respect to r2.

Overall, the angle between the initial ray r1 and the final ray r3 is approximately 130°, this is the angle ε formed between the initial optical axis X of the flux F1 and the axis X' of the flux F2 depicted in FIG. 2. This angle can be adjusted in any given range, for example between 100° and 150°, in particular between 120° and 140°.

The fact that the departure surface 8 of the flute is convex makes it possible to better adjust the distribution of the beam F2, in particular horizontal. Alternatively, this surface could be planar, and the possibility of adjusting the distribution, in particular horizontal, of the beam can be obtained by slightly curving the arrival face 7 of the flute. The two faces 6 and 7 can also both be planar or both slightly curved, convex and rounded. In the case where the lens is molded, this choice will advantageously take account of the ease of molding the piece, preferably avoiding shapes requiring relief angles that are not easily moldable.

Figure 4:
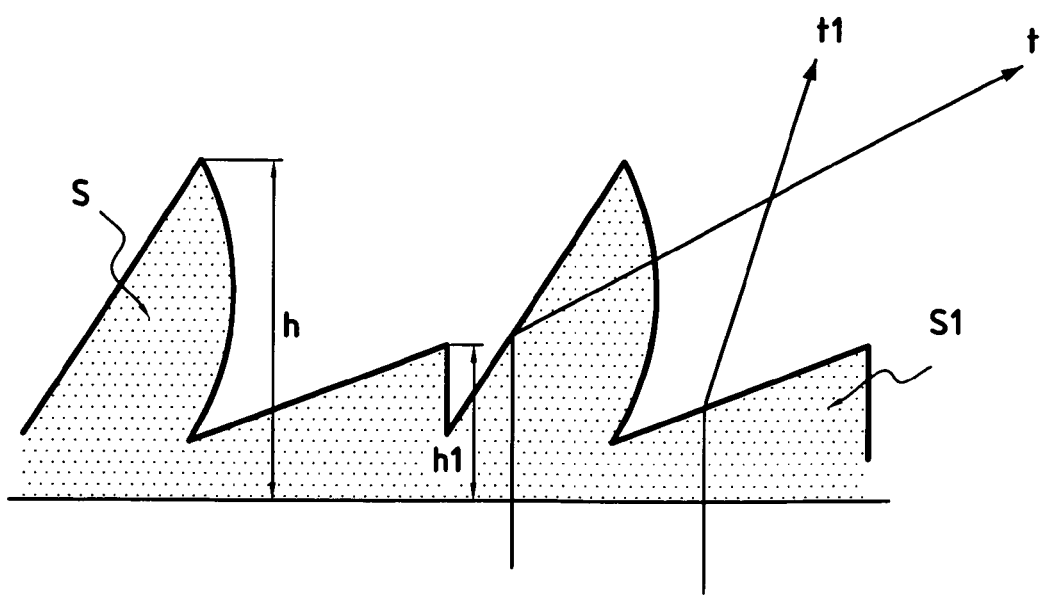
FIG. 4: a schematic view of a variant of an optical module lens according to the invention.

FIG. 4 is a variant of the invention: it depicts a portion of a lens, with an alternation of two types of flute: the flutes S already described with the help of the previous figures, but which alternate this time with flutes S1 working in refraction. The arrow t shows for the record and in a simplified fashion the path of a light ray arriving on the flute S working in total reflection. The arrow t1 shows the path of a light ray striking a flute S1 working in refraction. In the first case there is a strong diversion between the incoming ray and the outgoing ray, with reflection on one face of the flute S and then refraction on the other. In the second case, there is a single refraction on one of the faces of the flute S1, and in fact a much lesser diversion between incoming ray and outgoing ray (here a diversion angle approximately three times greater with the flutes S1). It should be noted that here the flutes S have a height h at least twice as great as the height h1 of the flutes S1.

Thus alternating the flutes with different geometries gives an additional freedom for adjusting the horizontal distribution, the angular distribution of the global beam F2. It is also possible to alternate n flutes S with n1 flutes S1, with n and/or n1 greater than 1.

What is claimed is:

1. An optical module for a motor vehicle, the optical module comprising:
   (a) a light source which emits light rays, the light source having an optical axis;
   (b) a reflector which reflects light rays emitted by the light source; and
   (c) an optical element disposed in front of the light source, the optical element having an entry face which is substantially planar and substantially perpendicular to the optical axis of the light source and an exit face which comprises an arrival surface and a departure surface, wherein at least some of the light rays reflected by the reflector and then received by the entry face of the optical element are internally reflected within the optical element by the arrival surface of the exit face and directed through the departure surface of the exit face.

2. The module according to claim 1, wherein the optical element is a lens.

3. The module according to claim 1, wherein the exit face of the optical element has a profile comprising a succession of flutes, each flute having a ridge and the general orientation of the ridges is along an axis substantially perpendicular to the optical axis.

4. The module according to claim 3, wherein the ridges of the flutes have a general orientation along an axis that is substantially vertical, or oblique with respect to the vertical.

5. The module according to claim 3, wherein the flutes are defined by a ridge delimiting
   (a) a first arrival surface that works in total reflection vis-à-vis the light rays coming from the entry face of the optical element and arriving on the surface, and
   (b) a second departure face for the light rays, and which works in refraction vis-à-vis the light rays coming from the entry face of the optical element and arriving on the surface.

6. The module according to claim 3, wherein the flutes on the exit face of the lens have a first arrival surface for the rays, which is planar or curved, such that the planar surface or the plane tangent to the curved surface is inclined with respect to the optical axis of the optical module by an angle of at least 20°, in particular between 25° and 50°.

7. The module according to claim 3, wherein the flutes on the exit face of the lens have a first arrival surface for the rays, which is planar or curved, such that the planar surface or the plane tangent to the curved surface is inclined with respect to the entry face of the lens by an angle of at least 40°, in particular between 40° and 65°.

8. The module according to claim 3, wherein the flutes on the exit face of the lens have a second departure surface for the rays, which is planar or curved, the angle at the vertex of the ridge between the arrival face and the departure face or their respective tangents being between 20° and 75°.

9. The module according to claim 3, wherein the flutes are contiguous.

10. The module according to claim 3, wherein the flutes are non-contiguous.

11. The module according to claim 3, wherein the height of each flute is between 0.2 and 12 mm.

12. The module according to claim 1, wherein the reflector is of the complex-surface type, or of the type with parabolic generatrices, or of the elliptical type.

13. The module according to claim 1, wherein the module produces a light beam with cutoff.

14. The module according to claim 1, wherein the module comprises a complementary lighting module for a motor vehicle headlight equipped with a fixed bending dipped function.

15. The module according to claim 1, wherein the module fulfils the "cornering" lateral lighting function of a motor vehicle headlight.

16. The module according to claim 1, wherein the optical element is oriented relative to the motor vehicle to emit a light beam laterally for a right-hand headlight or a left-hand headlight.

17. The module according to claim 1, wherein the module produces a light beam without cutoff.

18. An optical module for a motor vehicle, the optical module comprising:

(a) a light source which emits light rays, the light source having an optical axis;
(b) a reflector which reflects light rays emitted by the light source; and
(c) an optical element disposed in front of the light source, the optical element having an entry face which is substantially planar and substantially perpendicular to the optical axis of the light source and an exit face which comprises an arrival surface and a departure surface, wherein at least some of the light rays reflected by the reflector and then received by the entry face of the optical element are internally reflected within the optical element by the arrival surface of the exit face and directed through the departure surface of the exit face and wherein the exit face of the optical element has a profile comprising a succession of flutes, each flute having a ridge and the general orientation of the ridges is along an axis substantially perpendicular to the optical axis, and the succession of flutes comprises alternating first flutes and second flutes, wherein the first flutes deviate the light rays by total reflection and refraction and the second flutes deviate the light rays only by refraction.

19. A motor vehicle headlight, comprising at least one optical module comprising a light source which emits light rays and has an optical axis, a reflector which reflects light rays emitted by the light source, and an optical element disposed in front of the light source having an entry face which is substantially planar and substantially perpendicular to the optical axis of the light source and an exit face which comprises an arrival surface and a departure surface, wherein at least some of the light rays reflected by the reflector and then received by the entry face of the optical element are internally reflected within the optical element by the arrival surface and directed through the departure surface of the exit face.

* * * * *